(12) United States Patent
Harumoto et al.

(10) Patent No.: US 8,508,354 B2
(45) Date of Patent: Aug. 13, 2013

(54) FUEL-SAVING DRIVING DIAGNOSTIC DEVICE, FUEL-SAVING DRIVING DIAGNOSTIC SYSTEM, CONTROL DEVICE OF PRIME MOVER, FUEL-SAVING DRIVING RATING DEVICE, AND FUEL-SAVING DRIVING DIAGNOSTIC METHOD

(75) Inventors: Satoshi Harumoto, Kobe (JP); Kouei Kiyo, Kobe (JP); Shojiro Takeuchi, Tokyo (JP); Naoki Miura, Toyokawa (JP); Masaki Nakamura, Okazaki (JP); Hiroaki Sugiura, Okazaki (JP); Yoshio Yamatani, Okazaki (JP); Junichi Nonomura, Okazaki (JP); Nobutaka Tauchi, Toyoake (JP)

(73) Assignees: Fujitsu Ten Limited, Kobe-shi (JP); Toyota Jidoshakabushiki Kaisha, Toyota (JP); Aisin AW Co., Ltd, Anjo-shi (JP); Denso Corporation, Kariya-shi (JP)

( * ) Notice: Subject to any disclaimer, the term of this patent is extended or adjusted under 35 U.S.C. 154(b) by 86 days.

(21) Appl. No.: 13/056,787

(22) PCT Filed: Jul. 30, 2009

(86) PCT No.: PCT/JP2009/063592
§ 371 (c)(1),
(2), (4) Date: Jan. 31, 2011

(87) PCT Pub. No.: WO2010/013784
PCT Pub. Date: Feb. 4, 2010

(65) Prior Publication Data
US 2011/0133921 A1 Jun. 9, 2011

(30) Foreign Application Priority Data

Jul. 31, 2008 (JP) .................................. 2008-198383

(51) Int. Cl.
*B60Q 1/00* (2006.01)
*G05B 1/00* (2006.01)
*B60T 8/32* (2006.01)
*G06F 19/00* (2006.01)
*G01F 9/00* (2006.01)

(52) U.S. Cl.
USPC ........... 340/439; 340/441; 340/443; 340/467; 701/93; 701/114; 73/114.52

(58) Field of Classification Search
None
See application file for complete search history.

(56) References Cited

U.S. PATENT DOCUMENTS 7,159,623 B1 * 1/2007 Carr et al. ................... 141/94
7,454,962 B2 * 11/2008 Nishiyama et al. ........ 73/114.52

(Continued)

FOREIGN PATENT DOCUMENTS

| JP | A-2003-106182 | 4/2003 |
| JP | A-2005-337229 | 12/2005 |
| JP | A-2006-243856 | 9/2006 |

OTHER PUBLICATIONS

International Search Report in International Application No. PCT/JP2009/063592; dated Sep. 29, 2009 (with English-language translation).
Nov. 5, 2012 Office Action issued in Chinese Patent Application No. 200980130254.2 (with Translation).

*Primary Examiner* — George Bugg
*Assistant Examiner* — Renee Dorsey
(74) *Attorney, Agent, or Firm* — Oliff & Berridge, PLC

(57) ABSTRACT

An accelerator-off, fuel-cut traveling determining unit determines whether the number of engine revolutions of a vehicle is equal to or higher than a predetermined value, whether an accelerator opening rate is equal to or lower than a predetermined value, and whether a traveling state is an accelerator-off, fuel-cut traveling state where a quantity of fuel injection to an engine is 0. When it is determined that the traveling state is the accelerator-off, fuel-cut traveling state, the traveling distance adding-up unit adds up accelerator-off, fuel-cut traveling distances. A fuel-saving driving rating unit rates driving by a driver based on each of the added-up values which were added up by the traveling distance adding-up unit. A fuel-saving driving advice generating unit notifies the driver of a fuel-saving driving advice together with a rating result in accordance with the rating result. Therefore, it is possible to encourage the driver to perform early engine operation by an engine braking, and to enhance the driver's awareness of fuel saving driving.

5 Claims, 8 Drawing Sheets

(56) References Cited

U.S. PATENT DOCUMENTS

| | | | |
|---|---|---|---|
| 7,877,198 B2* | 1/2011 | Tenzer et al. | 701/123 |
| 2007/0213920 A1* | 9/2007 | Igarashi et al. | 701/114 |
| 2007/0256481 A1* | 11/2007 | Nishiyama et al. | 73/113 |
| 2007/0262855 A1* | 11/2007 | Zuta et al. | 340/439 |
| 2008/0033624 A1* | 2/2008 | Gronau et al. | 701/93 |
| 2009/0099724 A1* | 4/2009 | Kranz et al. | 701/35 |

* cited by examiner

FIG.2

| VEHICLE SPEED RANGE [km/h] || ACCELERATOR-OPENING-RATE UPPER LIMIT VALUE [%] |
|---|---|---|
| LOWER LIMIT VALUE | UPPER LIMIT VALUE | |
| 0 | 10 | a1 |
| 10 | 20 | a2 |
| 20 | 30 | a3 |
| 30 | 50 | a4 |
| 50 | 70 | a5 |
| 70 | 90 | a6 |
| 90 | ~ | a7 |

FIG.3

| ITEM NO. | ACCELERATOR-OFF DETERMINING ITEM | CURRENT VALUE | DIAGNOSIS CONDITION VALUE (INITIAL VALUES) || DIAGNOSIS CONDITION VALUE (CHANGED VALUE) ||
|---|---|---|---|---|---|---|
| | | | LOWER LIMIT VALUE | UPPER LIMIT VALUE | LOWER LIMIT VALUE | UPPER LIMIT VALUE |
| 1 | ENGINE REVOLUTION NUMBER [rpm] | r | r1 | - | r3 | - |
| 2 | ACCELERATOR OPENING RATE [%] | o | - | o2 | - | o4 |
| 3 | FUEL INJECTION AMOUNT [mL] | f | - | 0 | - | f4 |
| ⋮ | ... | ... | ... || ... ||

FIG.4

| ACCELERATOR-OFF, FUEL-CUT TRAVELING SCORE | | EXAMPLE OF ADVICES |
|---|---|---|
| LOWER LIMIT VALUE [%] | UPPER LIMIT VALUE [%] | |
| 0 | 50 | YOUR DRIVING IS EXTREMELY BAD FOR ENVIRONMENT. YOU SHOULD DRIVE MORE ECO-FRIENDLY. |
| 50 | 80 | YOU DRIVE ENVIRONMENTALLY-FRIENDLY, BUT YOU CAN DRIVE MORE ECO-FRIENDLY. |
| 80 | ~ | YOU DRIVE ENVIRONMENTALLY-FRIENDLY. PLEASE KEEP THIS ECO-FRIENDLY DRIVING. |

FIG.8

```
                                              ┌─ 16
┌─────────────────────────────────────────────┐
│                                             │
│      ACCELERATOR-OFF, FUEL-CUT              │
│      TRAVELING SCORE=20 SCORES              │
│                                             │
│      ACCELERATOR-OFF, FUEL-CUT              │
│       TRAVELING DISTANCE=3 [km]             │
│                                             │
│   ONE-TRIP TRAVELING DISTANCE=15 [km]       │
│                                             │
└─────────────────────────────────────────────┘
```

FIG.9

```
                                              ┌─ 16
┌─────────────────────────────────────────────┐
│                                             │
│      ACCELERATOR-OFF, FUEL-CUT              │
│      TRAVELING SCORE=20 SCORES              │
│                                             │
│                                             │
│    YOUR DRIVING IS EXTREMELY BAD FOR        │
│              ENVIRONMENT.                   │
│    YOU SHOULD DRIVE MORE ECO-FRIENDLY.      │
│                                             │
└─────────────────────────────────────────────┘
```

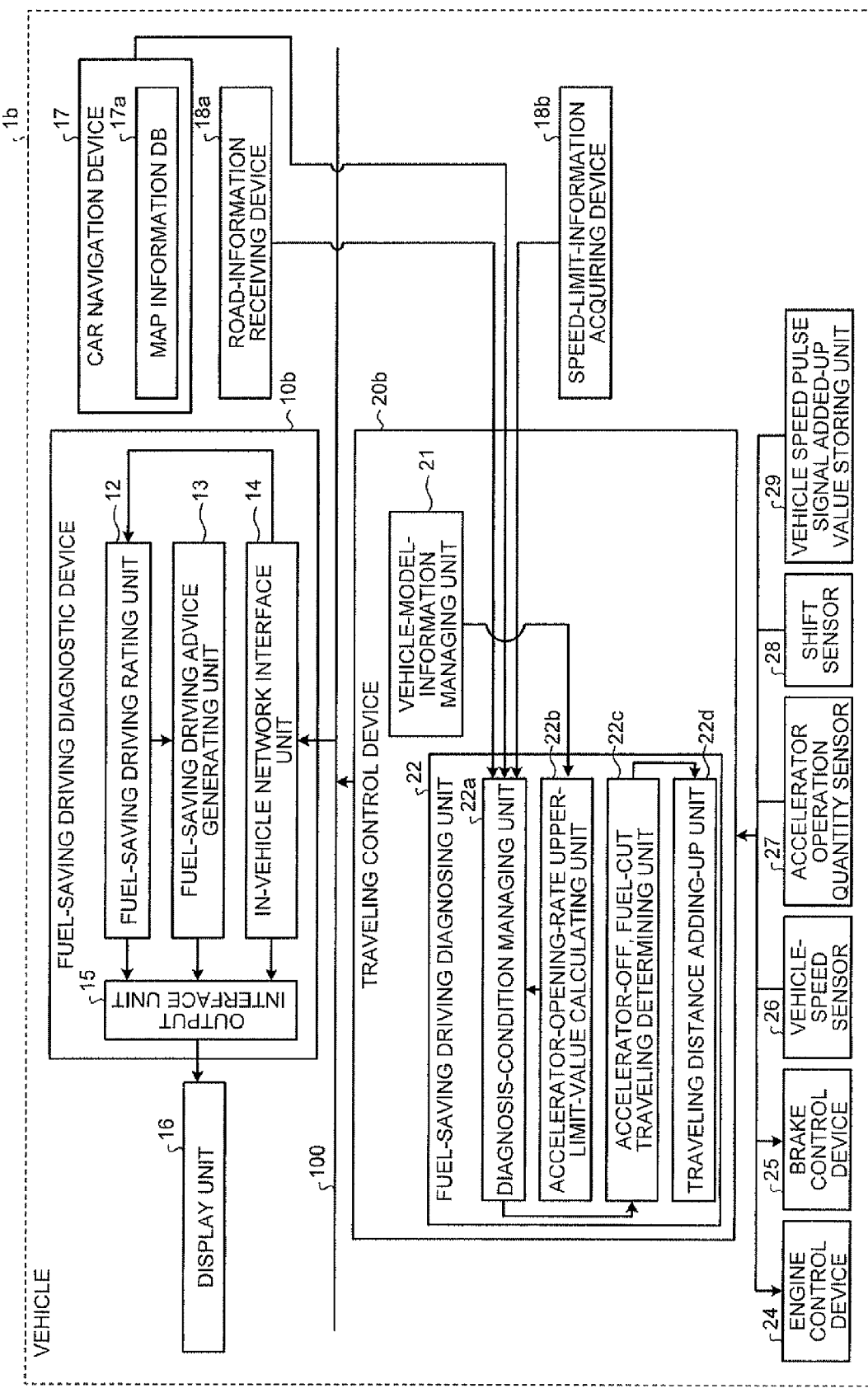

FUEL-SAVING DRIVING DIAGNOSTIC DEVICE, FUEL-SAVING DRIVING DIAGNOSTIC SYSTEM, CONTROL DEVICE OF PRIME MOVER, FUEL-SAVING DRIVING RATING DEVICE, AND FUEL-SAVING DRIVING DIAGNOSTIC METHOD

FIELD

The present invention relates to a fuel-saving driving diagnostic device, a fuel-saving driving diagnostic system, a control device of a prime mover, a fuel-saving driving rating device and a fuel-saving driving diagnostic method for diagnosing and rating fuel-saving driving based on a distance through which a driver drives a vehicle without consuming fuel by appropriate operation of an accelerator, and notifying the rating result to the driver to raise awareness of the fuel-saving driving.

BACKGROUND

In recent years, fuel saving characteristics of vehicles are again regarded as important, as the global environmental issues are drawing more attention. As for the global environmental issues, measures need to be promptly taken against global warming. Vehicles with gasoline engines that emit greenhouse gases such as carbon dioxide have been repeatedly improved, fuel efficiency is enhanced, and discharged greenhouse gases are reduced.

An electric vehicle using, as a driving source, a motor having higher energy utilizing efficiency than that of a gasoline engine, and a hybrid car using both a gasoline engine and a motor as driving sources are developed, and the fuel saving characteristics of vehicle are enhancing for sure.

However, no matter how high the original fuel saving characteristics of the vehicle are, if a driver's driving manner is against the fuel saving, e.g., if the operation of an accelerator is unsuitable and an engine braking is not effectively utilized, the high fuel saving characteristics of the vehicle would be meaningless. To address this issue, conventional technologies have been devised to prompt the driver to operate the accelerator in an appropriate manner so as to effectively utilize the engine braking, and to give notification to the driver to encourage the fuel-saving driving.

According to one of the conventional technologies for example, operation time of engine braking and operation time of an auxiliary brake (normal disk or drum brake) during the driving operation were recorded, and the fuel saving driving by a driver was rated based on a ratio of the operation time of the auxiliary brake to the operation time of the engine braking. The driver is informed of a rating result and prompted to operate the accelerator such that the engine braking is effectively utilized with the least use of the auxiliary brake.

CITATION LIST

Patent Literature

Patent Literature: Japanese Patent Application Laid-open No. 2003-106182

SUMMARY

Technical Problem

According to the conventional technologies, it is possible to suppress the use of the auxiliary brake to the least while the engine braking is working by providing the result of rating based on the ratio of the operation time of the auxiliary brake to the operation time of the engine braking.

However, the above-described conventional technology is designed to suppress the use of the auxiliary brake by providing the result of rating. Hence, this technology is not designed to encourage the use of engine braking itself, or to prompt the driver to perform early braking operation utilizing the engine braking alone. This is because when the rating is based on the ratio of the operation time of the auxiliary brake to the operation time of the engine braking, the result of rating does not reflect positive evaluation of the use of engine braking itself.

A fuel-saving driving diagnostic device, a fuel-saving driving diagnostic system and a fuel-saving driving diagnostic method as disclosed are made to solve the problems, and it is an object of the invention to provide a fuel-saving driving diagnostic device, a fuel-saving driving diagnostic system, a control device of a prime mover, a fuel-saving driving rating device and a fuel-saving driving diagnostic method capable of positively evaluating the use of engine braking and capable of prompting a driver to perform early braking operation using only the engine braking.

Solution to Problem

To solve the problems as described above and to achieve an object, according to a fuel-saving driving diagnostic device, a fuel-saving driving diagnostic system and a fuel-saving driving diagnostic method as disclosed: managing an accelerator-off traveling condition which is a condition defining a control status of a vehicle for determining whether the vehicle is performing an accelerator-off traveling or not; changing the accelerator-off traveling condition according to a road condition or a traffic condition acquired by a road/traffic condition acquiring device which acquires a road condition and/or a traffic condition; determining whether the control status of the vehicle satisfies the accelerator-off traveling condition or not; making a fuel-saving-driving diagnosis by determining whether to make determination on whether the control status of the vehicle satisfies the accelerator-off traveling condition or not based on the condition of a current traveling position of the vehicle acquired by the road/traffic condition acquiring device; calculating a total traveling distance of the vehicle within a predetermined time period; calculating an accelerator-off traveling distance for which it is determined that the control status of the vehicle satisfies the accelerator-off traveling condition; rating the fuel-saving driving based on the total traveling distance and the accelerator-off traveling distance; generating a fuel-saving driving advice based on a result of rating; and notifying a driver one of a rating result and a fuel-saving driving advice.

Advantageous Effects of Invention

According to the fuel-saving driving diagnostic device, fuel-saving driving diagnostic system and fuel-saving driving diagnostic method as disclosed herein, a driver is prompted to perform early braking operation utilizing the engine braking alone and with the least use of the auxiliary brake. In addition, evaluation of the accelerator-off traveling distance is performed only when the road condition and traffic condition are such that the braking operation by the engine braking is preferable. Thus, the use of engine braking itself is positively evaluated and encouraged. As a result, it is possible to raise the awareness of the driver for the accelerator-off driving, and give the driver a knowledge that the accelerator-off driving such as the driving utilizing the engine braking is economical and eco-friendly.

BRIEF DESCRIPTION OF DRAWINGS

FIG. 2 is a diagram illustrating one example of an accelerator-opening-rate upper-limit-value table.

FIG. 3 is a diagram illustrating one example of an accelerator-off, fuel-cut traveling determination condition table.

FIG. 4 is a diagram illustrating one example of a fuel-saving driving advice table in which fuel-saving-driving advices are stored in association with the accelerator-off, fuel-cut traveling score.

FIG. 8 is a diagram illustrating one example of display formats of an accelerator-off, fuel-cut traveling score and an accelerator-off, fuel-cut traveling distance.

FIG. 9 is a diagram illustrating display formats of an accelerator-off fuel cut traveling score and a fuel-saving driving advice.

FIG. 10 is a block diagram illustrating configurations of a fuel-saving driving diagnostic device and related devices according to a modified example of the embodiment.

DESCRIPTION OF EMBODIMENTS

One example of an embodiment of a fuel-saving driving diagnostic device, a fuel-saving driving diagnostic system and a fuel-saving driving diagnostic method will be described in detail below with reference to the accompanying drawings. In the description of the example of the embodiment below, a vehicle which is driven using fossil fuel as a fuel (energy) such as a vehicle having a gasoline engine will be described as an example.

However, the application of the invention is not limited to the application for those vehicles driven using fossil fuel as a fuel (energy), such as those having gasoline engine. The invention is applicable to a hybrid car which has both the gasoline engine (or other engine using fossil fuel as energy) and a driving motor (motor, hereinafter), and which travels while switching between the driving sources in accordance with driving conditions. The invention is widely and generally applicable to any vehicles driven by energy, e.g., an electric car, a fuel cell car and a vehicle which travels using a motor as a driving force.

One Example of Embodiment

Figure 1:
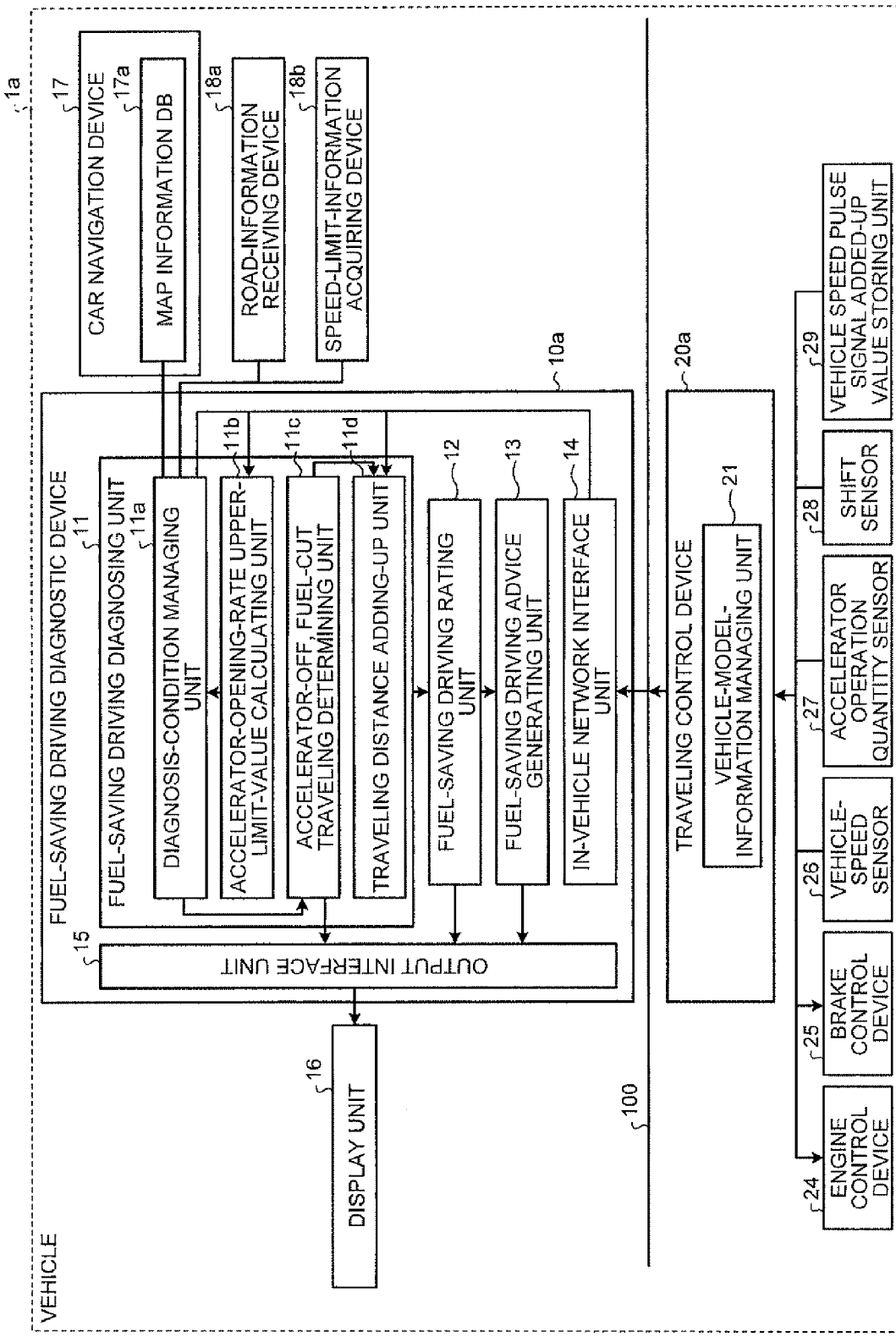
FIG. 1 is a block diagram illustrating configurations of a fuel-saving driving diagnostic device and related devices according to one example of an embodiment.

One example of a fuel-saving driving diagnostic device, a fuel-saving driving diagnostic system and a fuel-saving driving diagnostic method according to the embodiment will be described with reference to FIGS. 1 to 9. FIG. 1 is a block diagram illustrating exemplary configurations of the fuel-saving driving diagnostic device and related devices of a vehicle 1*a* according to the embodiment.

As illustrated in FIG. 1, a fuel-saving driving diagnostic device 10*a* includes a fuel-saving driving diagnosing unit 11, a fuel-saving driving rating unit 12, a fuel-saving driving advice generating unit 13, an in-vehicle network interface unit 14 and an output interface unit 15. Further, the fuel-saving driving diagnostic device 10*a* is connected to a traveling control device 20*a* via the in-vehicle network interface unit 14 and an in-vehicle network 100. The traveling control device 20*a* is a computer which controls the traveling of the vehicle 1*a*, and includes a vehicle-model-information managing unit 21. Further, the fuel-saving driving diagnostic device 10*a* is connected to a display unit 16 via the output interface unit 15. The display unit 16 has a display screen.

The traveling control device 20*a* is connected to an engine control device 24 and a brake control device 25. The engine control device 24 controls a gasoline engine which drives the vehicle. The brake control device 25 controls a mechanical brake (such as a disk brake and a drum brake) according to the braking operation by the driver.

Further, the traveling control device 20*a* is connected to a vehicle-speed sensor 26 which detects the current speed of the vehicle, an accelerator operation quantity sensor 27 which detects the current amount of an accelerator operation by the driver, a shift sensor 28 which detects the current position of a shift lever and the current shift-mode status of the vehicle, and a vehicle speed pulse signal added-up value storing unit 29.

The vehicle speed pulse signal added-up value storing unit 29 stores a vehicle speed pulse signal added-up value, which is a value obtained by adding up the number of detection of vehicle-speed pulse signals by a pulse sensor. The pulse sensor is provided at an inner diameter of the wheel of the vehicle 1*a*. The vehicle-speed pulse signal is output every time the wheel rotates once. In other words, the vehicle speed pulse signal added-up value is a value obtained by adding up the number of rotations of the wheel. By calculating the difference between the vehicle-speed pulse-signal added-up values before and after a predetermined time period (e.g., 100 milliseconds) and multiplying the obtained value with the outer circumferential length of the wheel, the traveling distance of the vehicle 1*a* during the predetermined time period can be calculated.

The fuel-saving driving diagnosing unit 11 includes a diagnosis-condition managing unit 11*a*, an accelerator-opening-rate upper-limit-value calculating unit 11*b*, an accelerator-off, fuel-cut traveling determining unit 11*c* and a traveling distance adding-up unit 11*d*. The diagnosis-condition managing unit 11*a* manages conditions by which the traveling of the vehicle is determined to be an accelerator-off, fuel-cut traveling. The accelerator-off, fuel-cut traveling refers to a traveling during which the driver does not step on the accelerator and makes the vehicle coast. In other words, the accelerator-off, fuel-cut traveling is a driving during which the accelerator is not used (accelerator-off driving) and the fuel consumption is reduced. Specifically, an accelerator-opening-rate upper-limit-value table as illustrated in FIG. 2 and an accelerator-off, fuel-cut traveling determination condition table as illustrated in FIG. 3 are stored.

The accelerator-opening-rate upper-limit-value table as illustrated in FIG. 2 stores the upper limit value of the accelerator opening rate calculated by the accelerator-opening-rate upper-limit-value calculating unit 11*b* for each vehicle-speed range. The accelerator opening rate refers to the rate [%] of accelerator opening θ [deg] achieved by the current accelerator operation to the maximum accelerator opening θ [deg] determined according to each vehicle model.

The accelerator-off, fuel-cut traveling determination condition table illustrated in FIG. 3 includes, as determination items, i.e., items for determining whether the driving is the accelerator-off, fuel-cut traveling or not, an engine revolution [rpm], an accelerator opening rate [%] and a quantity of fuel injection [mL]. The current values of the engine revolution r [rpm], the accelerator opening rate o [%] and the quantity of fuel injection f [mL] are acquired from the engine control device 24, the accelerator operation quantity sensor 27 and the engine control device 24, respectively, via the traveling control device 20a every 100 milliseconds, for example.

The accelerator-off, fuel-cut traveling determination condition table further stores a current value, a diagnosis condition value (initial value) and a diagnosis condition value (changed value) for each determination item. In the accelerator-off, fuel-cut traveling determination condition table, the lower limit r1 [rpm] of the diagnosis condition value (initial value) of the engine revolution is the number of engine revolutions at which the vehicle can be regarded as performing the accelerator-off, fuel-cut traveling and is set for each vehicle model. For example, the lower limit r1 may be 1000 [rpm].

Further, in the accelerator-off, fuel-cut traveling determination condition table, the upper limit o2 [%] of the diagnosis condition value (initial value) of the accelerator opening rate is an accelerator opening rate at which the vehicle can be regarded as performing the accelerator-off, fuel-cut traveling and is set for each vehicle model. For example, the upper limit o2 is 0.5 [%]. Further, in the accelerator-off, fuel-cut traveling determination condition table, the upper limit of the diagnosis condition value (initial value) of the quantity of fuel injection is 0 [mL].

Further, the diagnosis condition value (changed value) indicates a value obtained as the diagnosis-condition managing unit 11a changes the diagnosis condition value (initial value) base on map information obtained from a map information DB 17a of a car navigation device 17, road condition and traffic condition received by a road-information receiving device 18a and speed-limit information acquired by a speed-limit-information acquiring device 18b. The diagnosis condition value (changed value) is a value which eases or tightens the diagnosis condition value (initial value).

The road-information receiving device 18a is a VICS (registered trademark) receiver or a DSRC (Dedicated Short Range Communications: Road-to-Vehicle Communications) device. The speed-limit-information acquiring device 18b may be a device which recognizes speed-limit indications on the road or the traffic signs, a device which receives speed-limit information of its current position by radio frequency, or a device which acquires speed-limit information of its current position based on map information.

The diagnosis-condition managing unit 11a eases and tightens the diagnosis condition value according to the map information, road condition, traffic condition and speed-limit information because of the following reasons. When the driving is determined to be the accelerator-off, fuel-cut traveling, it means that the driver achieves a fuel-saving driving. When determining whether the driver realizes an eco-driving (here, "eco" means ecology, and "eco-driving" means economical driving and/or eco-friendly driving) based on the accelerator-off, fuel-cut traveling score and the accelerator-off, fuel-cut traveling distance as described later, if the traffic environment and the traffic condition of the road on which the vehicle 1a travels are not taken into account, it would be difficult to make fair determination.

If the situation at the driving point where the vehicle 1a is traveling is not taken into account in determination of the accelerator-off, fuel-cut traveling, the scoring (rating) of the driving based on the result of determination will be advantageous to some drivers and disadvantageous to others, and thus will be unfair. To eliminate this unfairness, the diagnosis-condition managing unit 11a eases or tightens the diagnosis condition value according to the map information, road condition, traffic condition and speed-limit information, thereby realizing the fair diagnosis and fair rating to the satisfaction of the driver, i.e., the user.

When easing or tightening the diagnosis condition value according to the map information, road condition, traffic condition and speed-limit information, the upper limit or the lower limit of the diagnosis condition value as represented by a numerical value is increased/decreased by approximately 20% to 30%, for example, according to the condition.

The accelerator-opening-rate upper-limit-value calculating unit 11b calculates the upper limit value of the accelerator opening rate, that is the rate of the accelerator opening achieved by the accelerator operation to the maximum accelerator opening [θ] for each vehicle model and each vehicle speed range based on the vehicle-model information delivered by the traveling control device 20a. The upper limit value of the accelerator opening rate is each stored in the column of the "accelerator-opening-rate upper limit value" in the accelerator-opening-rate upper-limit-value table corresponding to each speed range. In the accelerator-off, fuel-cut traveling determination condition table, the upper limit o2 of the diagnosis condition value (initial value) of the accelerator opening rate is updated every 100 milliseconds, for example, with the accelerator-opening-rate upper limit value corresponding to the current vehicle speed.

The accelerator-off, fuel-cut traveling determining unit 11c determines whether the accelerator opening ratio o [%] of the vehicle 1a acquired via the traveling control device 20a satisfies the diagnosis condition value (changed value) as illustrated in FIG. 3. Then, in the similar manner, the accelerator-off, fuel-cut traveling determining unit 11c determines whether the engine revolution r [rpm] and the quantity of fuel injection f [mL] of the vehicle 1a acquired via the traveling control device 20a each satisfy the diagnosis condition value (changed value) illustrated in FIG. 3. This determination is the fuel-saving driving diagnosis. When the diagnosis condition values (changed value) of all the accelerator-off, fuel-cut traveling determination items are satisfied, the traveling distance adding-up unit 11d adds 100-msec traveling distance which is mentioned later to the accelerator-off, fuel-cut traveling distance.

When the road condition and the traffic condition are in a normal state, the accelerator-off, fuel-cut traveling determining unit 11c determines whether the accelerator-off, fuel-cut traveling determination items each fall within the range between the lower limit and the upper limit of the diagnosis condition value (initial value) illustrated in FIG. 3.

On the other hand, when the accelerator-off, fuel-cut traveling determining unit 11c determines that any one of the diagnosis condition values (changed values) illustrated in FIG. 3 is not satisfied, the traveling distance adding-up unit 11d does not add the 100-msec traveling distance to the accelerator-off, fuel-cut traveling distance.

The traveling distance adding-up unit 11d adds the 100-msec traveling distance to each of a one-trip traveling distance and the accelerator-off, fuel-cut traveling distance. The 100-msec traveling distance is acquired every 100 milliseconds from the vehicle speed pulse signal added-up value storing unit 29 via the traveling control device 20a.

The one-trip traveling distance is a distance which the vehicle 1a travels from the time the ignition is turned on until the ignition is turned off. The accelerator-off, fuel-cut traveling distance is a part of the one-trip traveling distance, and is a distance for which the diagnosis condition values (changed values) are satisfied for all the accelerator-off, fuel-cut traveling determination items.

A traveling distance of one traveling, which is a traveling distance from the time the vehicle starts until the vehicle stops, may be employed instead of the one-trip traveling distance. By adopting the distance of one traveling, it is possible to make more meticulous diagnosis of the driving.

The fuel-saving driving rating unit 12 of the fuel-saving driving diagnostic device 10a rates the driver's driving based on the added-up value obtained by the traveling distance adding-up unit 11d. Specifically, the accelerator-off fuel-cut traveling score is calculated by following equation.

$$\text{accelerator-off, fuel-cut traveling score} = \frac{\text{accelerator-off, fuel-cut traveling distance}}{\text{one-trip traveling distance}} [\%] \quad (1)$$

The accelerator-off, fuel-cut traveling score represents a "good" score for evaluating the fuel-saving driving of the driver. The fuel-saving driving rating unit 12 causes the display unit 16 to display the accelerator-off, fuel-cut traveling score, the accelerator-off, fuel-cut traveling distance and the one-trip traveling distance as illustrated in FIG. 8.

As described above, the accelerator-off, fuel-cut traveling score is calculated based on the accelerator-off, fuel-cut traveling distance and the one-trip traveling distance, and thus the degree of fuel-saving driving by the driver is rated. Therefore, fair, clear and understandable rating result can be presented to the driver. Hence, it is possible to encourage the driver to perform early engine braking, to raise awareness of the driver for the fuel-saving driving, and thereby to reduce fuel consumption and contribute to the environmental protection.

The fuel-saving driving advice generating unit 13 of the fuel-saving driving diagnostic device 10a causes the display unit 16 to display the fuel-saving driving advice as illustrated in FIG. 9 according to the accelerator-off, fuel-cut traveling score by referring to the fuel-saving-driving advice table illustrated in FIG. 4. FIG. 9 illustrates an example of a manner of display of the fuel-saving driving advice on the display unit 16. In FIG. 9, the fuel-saving driving advice is displayed together with the accelerator-off, fuel-cut traveling score.

Alternatively, the fuel-saving driving advice generating unit 13 may generate a message corresponding to each of the accelerator-off, fuel-cut traveling scores based on message templates.

Figure 5:
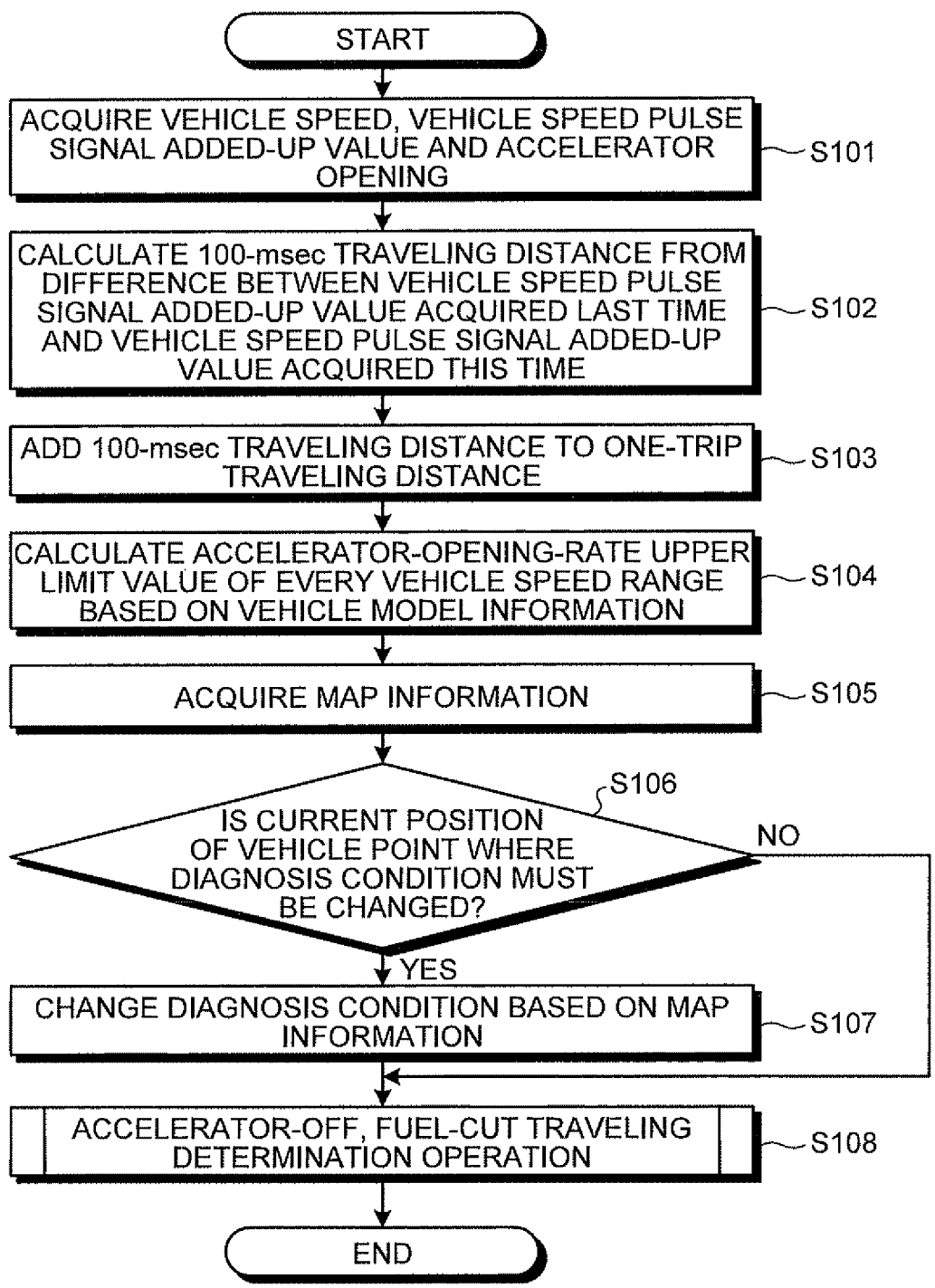
FIG. 5 is a flowchart illustrating procedures in an accelerator-off, fuel-cut traveling diagnosis process.

An accelerator-off, fuel-cut traveling diagnosis process performed by the fuel-saving driving diagnosing unit 11 of the fuel-saving driving diagnostic device 10a is described below. FIG. 5 is a flowchart illustrating the procedures of the accelerator-off, fuel-cut traveling diagnosis process. This process is performed every 100 milliseconds, for example. As illustrated in FIG. 5, firstly, the diagnosis-condition managing unit 11a acquires the vehicle speed, the vehicle speed pulse signal added-up value and the accelerator opening from the traveling control device 20a (step S101).

Subsequently, the traveling distance adding-up unit 11d calculates the 100-msec traveling distance based on the difference between the vehicle speed pulse signal added-up value acquired previously and the vehicle speed pulse signal added-up value acquired this time (step S102). Then, the traveling distance adding-up unit 11d adds the 100-msec traveling distance calculated in step S102 to the one-trip traveling distance (step S103).

Then, the accelerator-opening-rate upper-limit-value calculating unit 11b calculates the accelerator-opening-rate upper limit value for each vehicle speed range corresponding to the vehicle model based on the vehicle-model information (step S104). Then, the diagnosis-condition managing unit 11a acquires map information from the map information DB 17a (step S105).

Subsequently, the diagnosis-condition managing unit 11a determines whether the current position of the vehicle is a position which necessitates the change in diagnosis condition or not based on the acquired map information (step S106). When the diagnosis-condition managing unit 11a determines that the change in diagnosis condition is required (Yes in step S106), the process moves to step S107. When the diagnosis-condition managing unit 11a does not determine that the change in diagnosis condition is required (No in step S106), the process moves to step S108.

At step S107, the diagnosis-condition managing unit 11a changes the diagnosis condition for the fuel-saving driving based on the acquired map information. Then, at step S108, the accelerator-off, fuel-cut traveling determining unit 11c calculates the current accelerator opening rate and performs the accelerator-off, fuel-cut traveling determination process. The accelerator-off, fuel-cut traveling determination process will be described in detail later with reference to FIG. 6. As the process in step S108 finishes, the accelerator-off, fuel-cut traveling diagnosis process ends.

Figure 6:
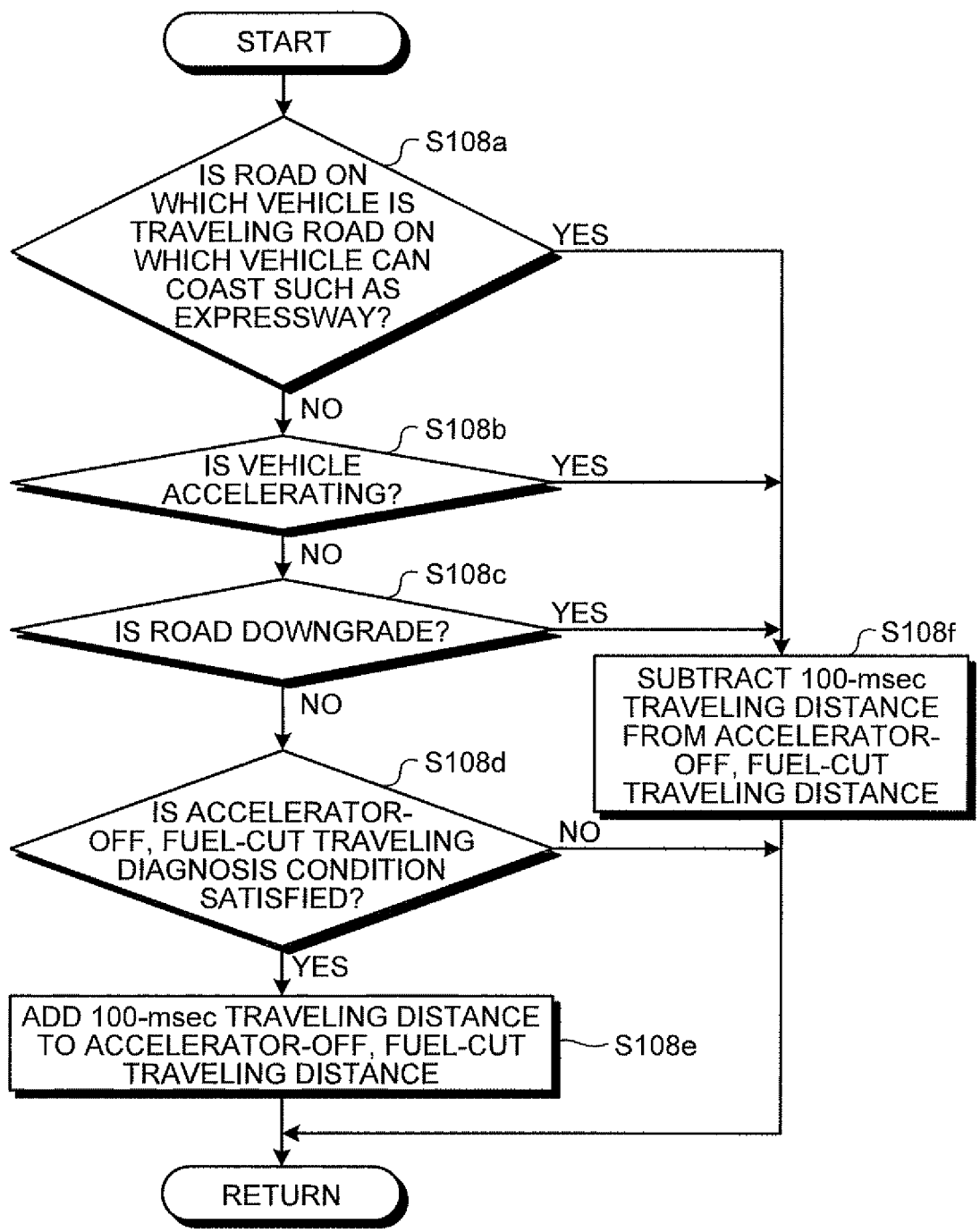
FIG. 6 is a flowchart illustrating procedures in accelerator-off, fuel-cut traveling determination process.

The accelerator-off, fuel-cut traveling determination process illustrated in step S108 of FIG. 5 is described below. FIG. 6 is a flowchart illustrating the procedures of the accelerator-off, fuel-cut traveling determination process. As illustrated in FIG. 6, firstly, the accelerator-off, fuel-cut traveling determining unit 11c determines whether the road on which the vehicle 1a is currently traveling is a road such as an expressway where the coasting is possible based on at least one of map information acquired from the map information DB 17a, the road/traffic information acquired from the road-information receiving device 18a, the speed-limit information acquired from the speed-limit-information acquiring device 18b and the current vehicle speed (step S108a).

When the accelerator-off, fuel-cut traveling determining unit 11c determines that the road on which the vehicle 1a is traveling is a road such as an expressway on which coasting is possible (Yes in step S108a), the process moves to step S108f. When the accelerator-off, fuel-cut traveling determining unit 11c does not determine that the road on which the vehicle 1a is traveling is a road such as an expressway on which coasting is possible (No in step S108a), the process moves to step S108b.

Subsequently, the accelerator-off, fuel-cut traveling determining unit 11c determines whether the vehicle 1a is accelerating or not based on the current accelerator opening acquired from the accelerator operation quantity sensor 27 via the traveling control device 20a (step S108b). When the accelerator-off, fuel-cut traveling determining unit 11c determines that the vehicle 1a is accelerating (Yes in step S108b), the process moves to step S108f. When the accelerator-off, fuel-cut traveling determining unit 11c does not determine that the vehicle 1a is accelerating (No in step S108b), the process moves to step S108c.

Then, the accelerator-off, fuel-cut traveling determining unit 11c determines whether the current position of the vehicle 1a is a downgrade or not based on the map information acquired from the map information DB 17a (step S108c). If the accelerator-off, fuel-cut traveling determining unit 11c determines that the current position is a downgrade (Yes in step S108c), the process moves to step S108f. When the accelerator-off, fuel-cut traveling determining unit 11*c* does not determine that the current position is a downgrade (No in step S108*c*), the process moves to step S108*d*.

Then, the accelerator-off, fuel-cut traveling determining unit 11*c* determines whether the current value r [rpm] of the engine revolution, the current value o [%] of the accelerator opening rate and the current value f [mL] of the quantity of fuel injection satisfy all the diagnosis condition on the accelerator-off, fuel-cut traveling determination condition table (step S108*d*). When the accelerator-off, fuel-cut traveling determining unit 11*c* determines that all the diagnosis conditions are met (Yes in step S108*d*), the process moves to step S108*e*. When the accelerator-off, fuel-cut traveling determining unit 11*c* does not determine that all the diagnosis conditions are met (No in step S108*d*), the accelerator-off, fuel-cut traveling determination process ends, and the process returns to the accelerator-off, fuel-cut traveling diagnosis process.

In step S108*f*, the accelerator-off, fuel-cut traveling determining unit 11*c* subtracts the 100-msec traveling distance calculated in step S102 of FIG. 5 from the one-trip traveling distance. Here, step S108*a*, S108*b*, and S108*c* define conditions for not performing the accelerator-off, fuel-cut traveling diagnosis, in other words, a condition for limiting the scene of diagnosis. For example, when the driver of the vehicle 1*a* steps on the accelerator on an expressway, the purpose is mainly to adjust the vehicle speed. In addition, the vehicle rarely decelerates on the expressway. Hence, the accelerator-off, fuel-cut traveling determination would not produce a meaningful rating result.

When the result of determination of at least one of steps S108*a*, S108*b* and S108*c* is Yes, the accelerator-off, fuel-cut traveling diagnosis is not performed, and the accelerator-off, fuel-cut traveling distance is not added. When the accelerator-off, fuel-cut traveling distance is not added up because the accelerator-off, fuel-cut traveling diagnosis is canceled, the meaning of no adding up is obviously different from the case where the accelerator-off, fuel-cut traveling distance is not added though the accelerator-off, fuel-cut traveling diagnosis is performed. Hence, in order to keep reliability of the accelerator-off, fuel-cut traveling score, the 100-msec traveling distance is subtracted from the one-trip traveling distance.

Figure 7:
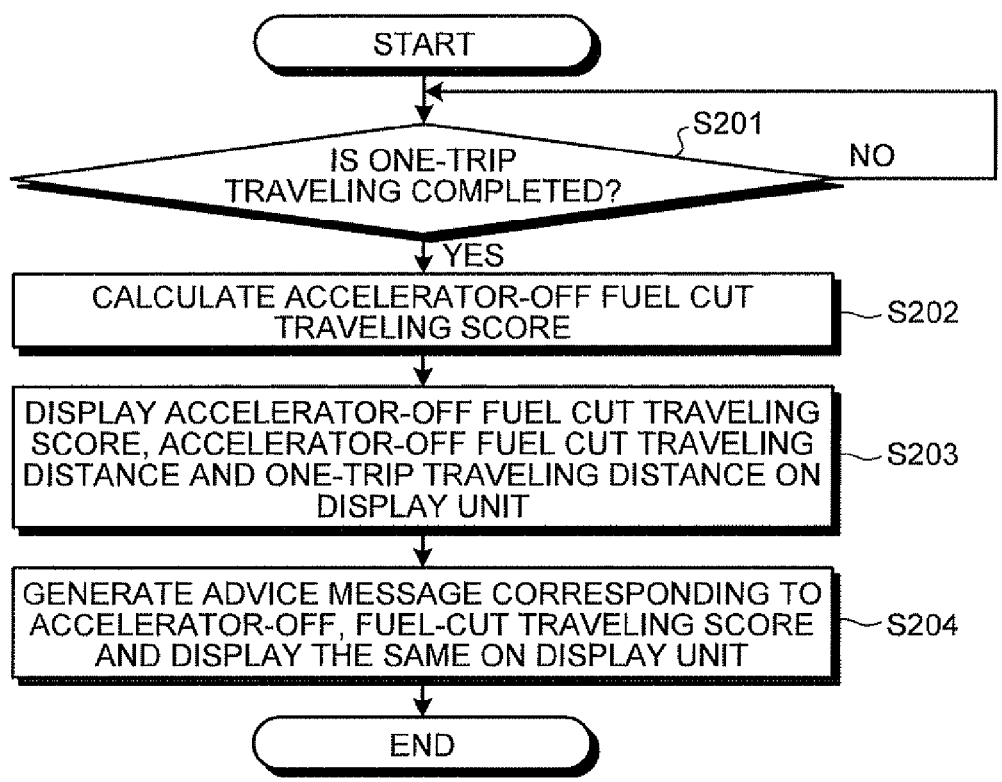
FIG. 7 is a flowchart illustrating procedures in an accelerator-off, fuel-cut traveling diagnosis rating result & advice notification process.

The accelerator-off, fuel-cut traveling diagnosis rating result & advice notification process, which is performed by the fuel-saving driving rating unit 12 and the fuel-saving driving advice generating unit 13 of the fuel-saving driving diagnostic device 10*a* is described next. FIG. 7 is a flowchart illustrating the procedures of the accelerator-off, fuel-cut traveling diagnosis rating result & advice notification process. As illustrated in FIG. 7, firstly the fuel-saving driving rating unit 12 determines whether the one-trip traveling ends or not (step S201). When the fuel-saving driving rating unit 12 determines that the one-trip traveling ends (Yes in step S201), the process moves to step S202. When the fuel-saving driving rating unit 12 does not determine that the one-trip traveling ends (No in step S201), the process returns to step S201.

In step S202, the fuel-saving driving rating unit 12 calculates the accelerator-off, fuel-cut traveling score based on the equation (1) described earlier. The fuel-saving driving rating unit 12 then causes the display unit 16 to display the accelerator-off, fuel-cut traveling score, which is calculated in the process of step S202, the accelerator-off, fuel-cut traveling distance and the one-trip traveling distance (step S203).

Then, the fuel-saving driving advice generating unit 13 causes the display unit 16 to display, together with the accelerator-off, fuel-cut traveling score, an advice message to raise awareness of the driver for the fuel-saving driving corresponding to the accelerator-off, fuel-cut traveling score (step S204). With the end of this process, the accelerator-off, fuel-cut traveling diagnosis rating result & advice notification process ends.

As described above, by presenting the rating result and the fuel-saving-driving advice to the driver, it is possible to raise awareness for positive use of the engine braking and for fuel-saving driving.

FIG. 10 illustrates a configuration of a fuel-saving driving diagnostic device 10*b* and a traveling control device 20*b* of a vehicle 1*b*. As illustrated in FIG. 10, the traveling control device 20*b* may include a fuel-saving driving diagnosing unit 22, unlike the configuration illustrated in FIG. 1 where the fuel-saving driving diagnosing unit 11 is in the fuel-saving driving diagnostic device 10*a* of the vehicle 1*a*. The configuration of FIG. 10 is the same as that of the example of the embodiment described earlier, other than the configuration of the fuel-saving driving diagnostic device and the traveling control device. With the configuration illustrated in FIG. 10, the configuration of the fuel-saving driving diagnostic device 10*b* can be simplified and the process burden can be reduced.

A diagnosis-condition managing unit 22*a*, an accelerator-opening-rate upper-limit-value calculating unit 22*b*, an accelerator-off, fuel-cut traveling determining unit 22*c* and a traveling distance adding-up unit 22*d* of the fuel-saving driving diagnosing unit 22 have the same function and configuration as the diagnosis-condition managing unit 11*a*, the accelerator-opening-rate upper-limit-value calculating unit 11*b*, the accelerator-off, fuel-cut traveling determining unit 11*c* and the traveling distance adding-up unit 11*d* of the fuel-saving driving diagnosing unit 11.

In the vehicle 1*b*, the accelerator-off fuel-cut traveling determining unit 22*c* and/or the traveling distance adding-up unit 22*d* may be included in the fuel-saving driving diagnostic device 10*b* rather than in the fuel-saving driving diagnosing unit 22. Further, the rating result and the advice may be notified to the driver of the vehicle 1*a*/1*b* by sound or voice rather than by visual display on the display unit 16.

According to the example of the embodiment as described above, the diagnosis condition for making the accelerator-off, fuel-cut traveling diagnosis is eased and tightened according to the traveling condition of the vehicle. Further, the accelerator-off, fuel-cut traveling diagnosis is not performed when a predetermined condition is met. Therefore, the diagnosis accuracy of the accelerator-off, fuel-cut traveling diagnosis can be increased and thus the accuracy of rating of the accelerator-off, fuel-cut traveling can be improved.

The example of the embodiment of the present invention has been described. The present invention, however, is not limited by the example above, and can be realized in various different embodiments within the scope of technical concept defined in the attached claims. Further, the effect described in relation to one example of the embodiment should not be taken as limiting the invention.

The respective procedures described in relation to the example of the embodiment, all of or some of the procedures described as to be automatically carried out may be manually carried out, or all of or some of the procedures described as to be manually carried out may be automatically carried out in a known manner. Other than that, arbitrary changes may be made to the operation sequences, control sequences, specific names, and information containing various kinds of data and parameters described in the above example of an embodiment, if not otherwise specified.

Further, each of the components of each device shown in the drawings is merely functional and conceptual, and does not need to be physically structured as in the drawings. Specifically, specific forms of separations and combinations of the devices are not limited to those shown in the drawings, but all of or part of them may be functionally or physically divided or integrated by an arbitrary unit, in accordance with various kinds of loads and the usage conditions.

Further, all of or arbitrary part of each processing function to be carried out in each device may be realized by a CPU (Central Processing Unit) (or a microcomputer such as a MPU (Micro Processing Unit) or a MCU (Micro Controller Unit)), or a program to be analyzed and executed by the CPU (or a microcomputer such as a MPU or MCU), or may be realized as hardware formed with wired logics.

INDUSTRIAL APPLICABILITY

The present invention is useful in a case where it is desirable to encourage a driver of a vehicle to perform early braking operation using only the engine braking and using the auxiliary brake to the least, to evaluate a coasting distance such that the use of engine braking itself is positively evaluated, to raise the awareness of the driver for the fuel-saving driving so as to reduce fuel consumption, and thereby to contribute to the environmental protection.

REFERENCE SIGNS LIST

| | |
|---|---|
| 1a, 1b | VEHICLE |
| 10a, 10b | FUEL-SAVING DRIVING DIAGNOSTIC DEVICE |
| 11 | FUEL-SAVING DRIVING DIAGNOSING UNIT |
| 11a | DIAGNOSIS-CONDITION MANAGING UNIT |
| 11b | ACCELERATOR-OPENING-RATE UPPER-LIMIT-VALUE CALCULATING UNIT |
| 11c | ACCELERATOR-OFF, FUEL-CUT TRAVELLING DETERMINING UNIT |
| 11d | TRAVELLING DISTANCE ADDING-UP UNIT |
| 12 | FUEL-SAVING DRIVING RATING UNIT |
| 13 | FUEL-SAVING DRIVING ADVICE GENERATING UNIT |
| 14 | IN-VEHICLE NETWORK INTERFACE UNIT |
| 15 | OUTPUT INTERFACE UNIT |
| 16 | DISPLAY UNIT |
| 17 | CAR NAVIGATION DEVICE |
| 17a | MAP INFORMATION DB |
| 18a | ROAD INFORMATION RECEIVING DEVICE |
| 18b | SPEED-LIMIT-INFORMATION ACQUIRING DEVICE |
| 20a, 20b | TRAVELLING CONTROL DEVICE |
| 21 | VEHICLE MODEL INFORMATION MANAGING UNIT |
| 22 | FUEL-SAVING DRIVING DIAGNOSING UNIT |
| 22a | DIAGNOSIS CONDITION MANAGING UNIT |
| 22b | ACCELERATOR-OPENING-RATE UPPER-LIMIT-VALUE CALCULATING UNIT |
| 22c | ACCELERATOR-OFF, FUEL-CUT TRAVELLING DETERMINING UNIT |
| 22d | TRAVELLING DISTANCE ADDING-UP UNIT |
| 24 | ENGINE CONTROL DEVICE |
| 25 | BRAKE CONTROL DEVICE |
| 26 | VEHICLE-SPEED SENSOR |
| 27 | ACCELERATOR OPERATION QUANTITY SENSOR |
| 28 | SHIFT SENSOR |
| 29 | VEHICLE SPEED PULSE SIGNAL ADDED-UP VALUE STORING UNIT |
| 100 | IN-VEHICLE NETWORK |

The invention claimed is:

1. A fuel-saving driving diagnostic device comprising:
a condition managing unit that manages an accelerator-off traveling condition which is a condition defining a control status of a vehicle for determining whether the vehicle is performing an accelerator-off traveling or not;
a determining unit that determines whether the control status of the vehicle satisfies the accelerator-off traveling condition or not;
an interval determining unit that determines whether an interval including a current traveling position of the vehicle is to cause the determining unit to make determination or not based on a condition of the current traveling position of the vehicle acquired by a road/traffic condition acquiring device that acquires a road condition and/or a traffic condition;
a total-traveling-distance calculating unit that calculates a total traveling distance of the vehicle within the interval determined to cause the determining unit to make determination by the interval determining unit;
an accelerator-off traveling distance calculating unit that calculates an accelerator-off traveling distance for which the determining unit determines that the control status of the vehicle satisfies the accelerator-off traveling condition; and
a fuel-saving driving rating unit that rates a fuel-saving driving based on the total traveling distance calculated by the total-traveling-distance calculating unit and the accelerator-off traveling distance calculated by the accelerator-off traveling distance calculating unit.

2. The fuel-saving driving diagnostic device according to claim 1, further comprising
a condition changing unit that changes the accelerator-off traveling condition according to the road condition or the traffic condition acquired by the road/traffic condition acquiring device.

3. The fuel-saving driving diagnostic device according to claim 1, further comprising
an advice generating unit that generates a fuel-saving driving advice based on a result of rating by the fuel-saving driving rating unit.

4. The fuel-saving driving diagnostic device according to claim 3, further comprising
a notifying unit that notifies a driver one of a rating result by the fuel-saving driving rating unit and a fuel-saving driving advice generated by the advice generating unit.

5. A fuel-saving driving diagnostic method for diagnosing fuel-saving driving of a vehicle, the method comprising:
managing an accelerator-off traveling condition which is a condition defining a control status of a vehicle for determining whether the vehicle is performing an accelerator-off traveling or not;
determining of the control status by determining whether the control status of the vehicle satisfies the accelerator-off traveling condition or not;
determining of an interval by determining whether an interval including a current traveling position of the vehicle is to perform the determining of the control status or not based on a condition of the current traveling position of the vehicle acquired by a road/traffic condition acquiring device that acquires a road condition and/or a traffic condition;
calculating a total traveling distance of the vehicle within the interval determined to perform the determining of the control status;
calculating an accelerator-off traveling distance for which the control status of the vehicle is determined to satisfy the accelerator-off traveling condition; and
rating a fuel-saving driving based on the total traveling distance calculated and the accelerator-off traveling distance calculated.

* * * * *